(No Model.) 2 Sheets—Sheet 2.
J. STEPHENSON.
ELECTRIC CAR TRUCK.
No. 424,372. Patented Mar. 25, 1890.
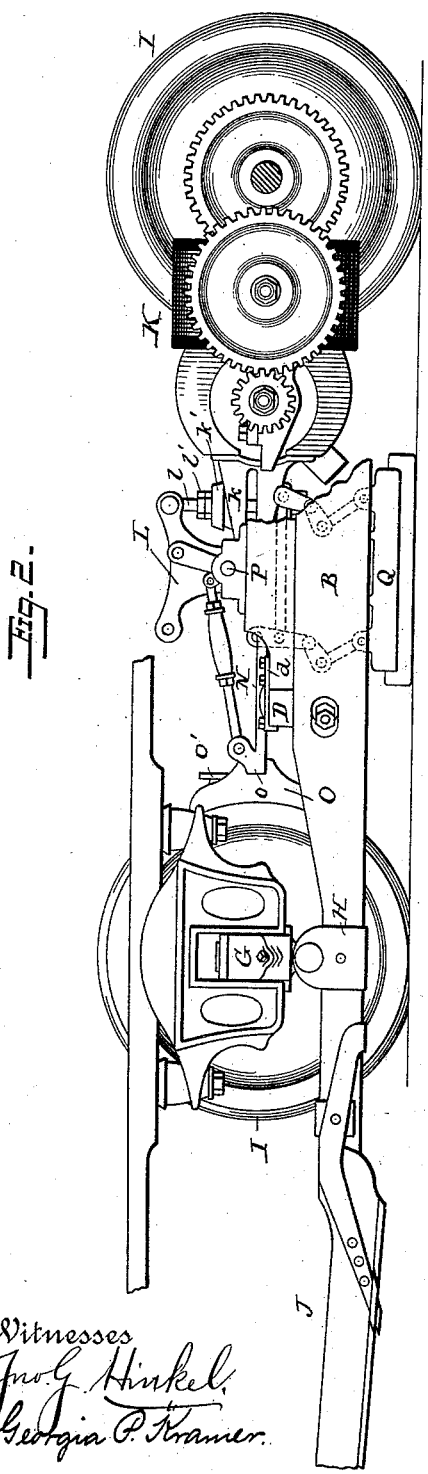
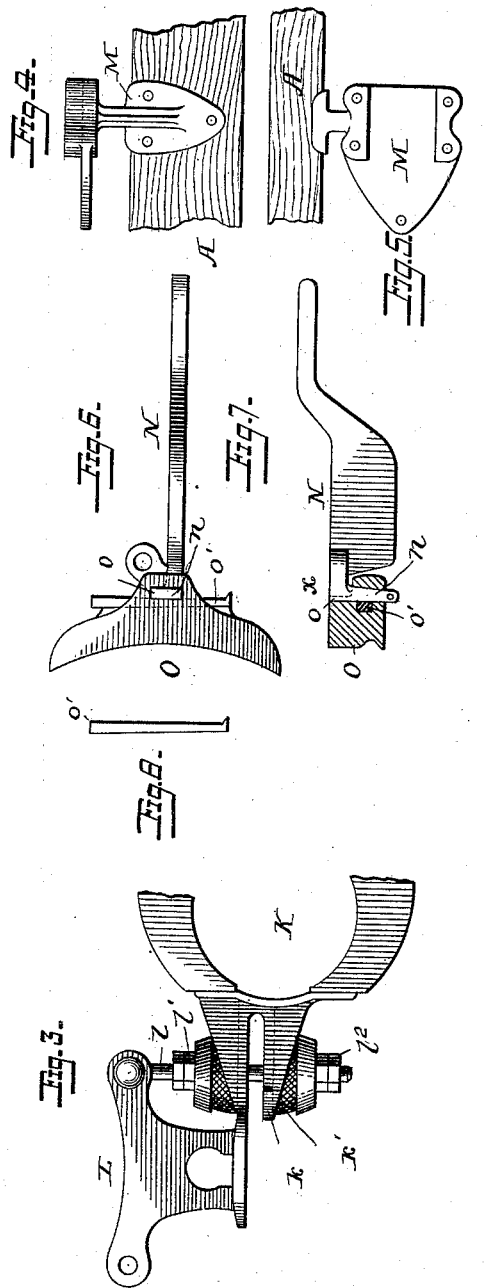

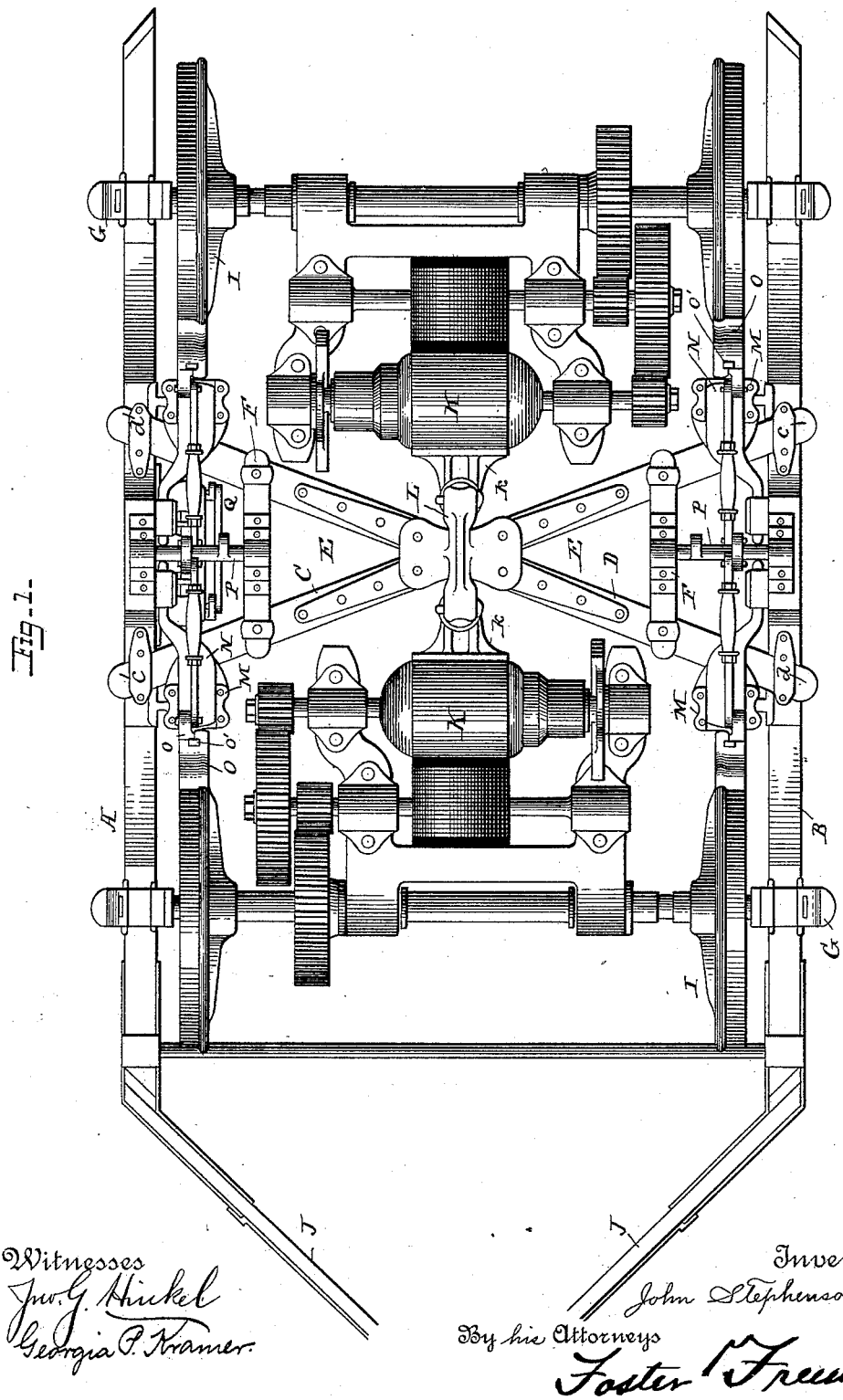

UNITED STATES PATENT OFFICE.

JOHN STEPHENSON, OF NEW YORK, N. Y.

ELECTRIC-CAR TRUCK.

SPECIFICATION forming part of Letters Patent No. 424,372, dated March 25, 1890.

Application filed January 16, 1890. Serial No. 337,068. (No model.)

*To all whom it may concern:*

Be it known that I, JOHN STEPHENSON, a citizen of the United States, residing at New York, in the county and State of New York, have invented certain new and useful Improvements in Electric-Car Trucks with Attachments, of which the following is a specification.

A car having but four wheels and propelled by one or more electric motors in its best adjustment requires a truck-frame independent of the car-body to carry the motor or motors and the brake mechanism and other appurtenances of the car. An electric-motor truck of rectangular construction becomes loose in the joints, tending to early disability and destruction. The truck-frame presented in the accompanying drawings, and which forms the subject-matter of my application, Serial No. 337,068, filed simultaneously herewith, being a combination of triangles, cannot change form, and therefore the integrity of the connections is not violated, and proper spaces are afforded for the motors whose noses approximate near each other at the center of the truck, where they are supported. The wheel-brakes and track-brakes are most efficient when detached from the car-body, as is also the track-guard and electro-motor engine.

My present invention is an electric-car truck of peculiar construction, carrying the various attachments necessary to the proper operation and control of the car.

In the accompanying drawings I have illustrated the preferred embodiment of my invention, in which—

Figure 1 is a plan view. Fig. 2 is a side view of the same; Fig. 3, a detailed view of the goose-neck for supporting the nose of the motor. Figs. 4 and 5 are respectively side and plan views of the wheel-brake bracket; and Figs. 6, 7, and 8 are respectively side and plan views of the brake-shoe and its bar, and a detail of the brake-shoe key.

The car-truck frame consists of two sills A B, connected by two rails C D, crossing each other at or near the center of the truck, with their ends $c$ $d$ secured to the side sills. The frame thus made incloses a triangular space E E at each side of the truck, suitable for the location of the wheel and track brake mechanisms. In some cases these mechanisms require at each side of the truck a short sub-sill F inside of and parallel to the sills A B and resting on the cross-rails C D. The ends of the sills are supported by the axle-boxes G, by a stirrup H, or other desired means outside of the wheels I, and track-guards J may be secured thereto.

The center of the truck, where the rails cross each other, is fitted to support the central end or ends of each of the electro-motors K, and I mount thereon a goose-neck L, provided with one or more vertical swinging bolts $l$, held in the upper end of the goose-neck by a cross-bolt passing through the vertical swinging bolt, the said bolt passing through the nose $k$ of the motor and having springs $k'$ above and below the nose of the motor, the elevation of which nose is adjustable by screw-nuts $l'$ $l^2$ on the pendent bolt.

In some cases the electro-motors occupy so much room that the ends of the cross-rails C D cannot approach the wheels sufficiently to support the brake-shoe sliding bar, and I therefore attach to the sill a bracket M of proper form to carry the shoe end of the shoe-bar N with its shoe O, the bar and shoe having freedom to move to and from the wheel. The rock-shaft P of the wheel-brake is supported at its outer end by the truck-sill, and at its inner end by a short sub-sill F, carried by the X cross-rails, and beneath this wheel-brake rock-shaft is space for supporting the track-brake mechanism Q, half of each of the brake mechanisms being located at each side of the truck and the two halves of the wheel-brake and of the track-brake join each in their own union rock-shaft secured to the car-floor, where it receives a connecting-rod, transmitting the operator's energy from the car-front to the brake mechanisms at both ends of the car in the usual way.

To accommodate special forms of motors, the ends of the cross-rails of the truck are framed to the truck-sills remote from the wheels, making the space so great that the brake-shoe bar requires support nearer the wheel, which is provided for by the brackets or rests M between the cross-rails and the wheels, secured to the sills or the cross-rails or to cross-rails and sills, and these brackets carry the ends of the shoe-bars with their shoes O. These shoes have eyes or mortises o, fitting on hooks or tenons n of the shoe-bar, and to prevent looseness in the joints a vertical keyway is made through the shoe at one side of the mortise, so that a wedge-key o' (shown in Fig. 8) may press against one side of the tenon and force it against the opposite side of the mortise, and the gravity of the wedge-key will tend to take up slack and keep the shoe to tightness on its tenon.

It is usual to provide electric cars with two electro-motors K, each independent of the other, one being secured on each car-axle, and the central side of each terminating in a nose or projection fitted for a rest-hanger holding the nose of the motor. The X form of truck is specially qualified to receive the motor-nose and support it by a suspension-bolt with its upper end in the head of a goose-neck and its base secured to the truck's center.

What I claim is—

1. A car-truck with its frame made with four pieces—namely, two sills and two cross-rails—the cross-rails crossing each other in X form at the middle of the truck, and having the ends of the rails framed or secured in the two sills, and having between the cross-rails and near the car-wheels brackets in which rest the brake-shoe bars with freedom for end motion, substantially as described.

2. A car-truck with its wheel-brake-shoe bars resting on brackets secured to the truck-sills between the wheels and the cross-rails of the truck, substantially as described.

3. A car-truck with its cross-rails crossing each other in X form, and at that crossing a goose-neck or equivalent device for holding the nose of the electro-motor with its remote side secured to the car-axle, substantially as described.

4. A car-truck with its cross-rails crossing each other in X form at the middle of the truck, and having there a goose-neck or other form rising above the cross-rails and with a pendent or vertical swinging bolt supporting the noses of the motor, substantially as described.

5. A car with its truck-frame of two sills connected by two rails crossing each other at the middle of the truck, and the corners of the truck secured beneath the four axle-boxes outside the wheels, substantially as described.

6. A car with its truck-sills connected by rails crossing each other at the truck-center, and in the triangular spaces between the cross-rails and each side of the truck a track-brake shoe, with other parts of its operating mechanism, substantially as described.

7. A brake-shoe with mortise fitting the tenon of a brake-shoe bar, the shoe having a vertical keyway suitable for a wedge-key, which when in place with its shoe on the shoe-bar will by gravity of the wedge-key tighten the shoe on its bar and hold the shoe steadily in its place, substantially as described.

8. A car-truck consisting of two sills connected by two rails crossing each other at the truck-center, at which place rises a goose-neck with its head toward the car-axle, the head holding a pendant suitable for holding the nose of the motor, substantially as described.

In testimony whereof I have signed my name to this specification in the presence of two subscribing witnesses.

JOHN STEPHENSON.

Witnesses:
S. A. STEPHENSON,
JOSEPH B. STEPHENSON.